Patented June 15, 1937

2,084,272

UNITED STATES PATENT OFFICE 2,084,272

PLASTIC COMPOSITION AND ARTICLES AND METHOD OF MAKING THE SAME

Alexander J. Auchterlonie, Grosse Pointe, Mich.

No Drawing. Application August 31, 1936, Serial No. 98,740

20 Claims. (Cl. 92—3)

This invention relates primarily to plastics and has for its principal object to provide as new and improved article of manufacture a cellular vehicle consisting of an agglomerate of natural cells in which the natural high liquid absorbent qualities of said cells have been retained.

A further object of the invention is to provide a new and improved method whereby the pithy portions of annuals, that is those plants which are planted from seed and reach maturity in a single growing season may be subjected to a simple inexpensive treatment to remove the gummy substances thereby to permit liquids to penetrate more readily into the cell structures and keep the material throughout its entire treatment so that the cellular structure thereof has not been impaired and its natural absorptive properties maintained.

Considered in its more specific aspects one of the principal objects of the present invention is to provide a new and improved plastic composition, in which the principal ingredient is a very cheap and readily obtainable raw material that can be handled in large quantities by simple, known manufacturing methods and machines.

Practically all of the synthetic plastic products heretofore manufactured have, as far as I am aware, been dependent upon the use of that broad class of substances designated generally by the term resins. Apparently no satisfactory, all inclusive definition of the term "resins" has yet been formulated and the conception of what is a resin is purely empirical, the decisive reasons for including a substance among the class of resins being determined by what may be termed the totality of properties which the substances may possess, among which properties the following are of more or less major importance, at least insofar as this invention is concerned: Those substances designated as resins, are characterized by the following properties:

Vegetable origin
Insolubility in water
Softening on heating
Fusibility, with formation of a more or less clear, adhesive liquid
Adhesive character of the solutions
Relative resistance towards reagents
Complete resistance to putrefaction, rancidity, etc.

Heretofore in the manufacture of plastics with resinous substances it has been the practice to employ various ingredients such as flock, asbestos, ground wood, paper pulp and other fibrous materials as fillers. The use has also been suggested of various powdered materials as fillers. The fibrous fillers are added to impart the required elasticity and pliability, to those resinous substances which are likely to be hard and solid but comparatively inelastic, while the non-fibrous, powdered or amorphous fillers serve to make the mass heavier or cheaper and harder. Moreover, all of the plastics made by the use of such fillers are thermosetic and not thermoplastic.

One of the principal objects of the present invention is to provide a new and improved vehicle especially adapted for plastic composition which will therefore be thermoplastic in character. I have discovered that the cells of substantially pure alpha cellulose obtained from the pithy portions or the so-called hurds as distinguished from the fibrous portions of annual plants are very highly absorptive so that such cells can be substantially completely and almost instantaneously impregnated with a resin of high viscosity which ordinarily cannot be absorbed by other substances such as fillers of a fibrous or amorphous nature, as have heretofore been employed in the manufacture of plastics.

I have also discovered that there is to be found in nature abundant sources of such alpha cellulose in very cheap materials, such for example as the hurds of flax, hemp, okra etc. which have heretofore been discarded as waste. The hurds of flax and hemp are particularly suitable for use in the manufacture of plastics because the beta and gamma cellulose, or the fibrous and gummy substances of flax and hemp stalks can very readily be removed by treating such stalks with a caustic soda solution; the chlorophyll and gummy substances, dissolving in a caustic soda solution while the alpha cellulose will not be dissolved by such a solution. Waste flax and hemp stocks or stalks, for example, can therefore be very readily treated by a simple soda cook in a paper mill to remove the gummy substances and to leave an amorphous mass or agglomeration of micelles or colloidal particles of pure alpha cellulose. This amorphous mass, or agglomeration in the form of the usual liquid pulp or stock, can then be passed directly to a special non-agitating Fourdrinier or other suitable paper making machine without, however, passing the stock through any beaters, Jordans, or other machines which would subject the stock to any severe mechanical treatment. The paper making machine is constructed with an adjustable inclined screen in accordance with the usual practice and the thickness of the sheets being principally controlled by the consistency of the pulp and the speed of the wire, as will be readily understood by those versed in the art; the paper being made up on the machine in strips of continuous rolls or sheets of paper consisting of substantially pure alpha cellulose composition of microscopically short lengths or threads of cellulose in cellular form.

In manufacturing the paper the treatment employed is similar to that used in making paper of the filter or blotting paper type but in which it is not subjected to any sizing or to any calendering or other heavy roll pressure in the paper making machine. After the paper is made, preferably in continuous rolls for speed of production, it consists of a cellular structure of substantially pure alpha cellulose cells or micelles united in the form of a coherent sheet.

If a plastic composition is desired the sheet is then passed through a solution of any suitable resinous material, and, due to the extremely high powers of absorption possessed by the substantially pure alpha cellulose cells, the entire cellular structure of the paper becomes thoroughly and instantly impregnated with the resin employed for impregnation. The impregnated paper is then subjected to a suitable drying operation and may be cut into sheets. It will of course be understood that any suitable color may be added to the resin and striated or any other desired color effects may be obtained in accordance with any of the well known practices employed in the manufacture of resins, plastic colors and dyes. Obviously the paper may be made to any desired thickness in single sheets and if comparatively thick boards or panels are to be made, one or more sheets of the resin impregnated paper may be superposed upon the other and by the application of heat and pressure, formed into a completely homogeneous solid. I have found that during the application of heat and pressure to form the material into panels of any desired thickness, the cells or micelles of the resin impregnated alpha cellulose paper flow freely under the application of such heat and pressure and realign or readjust themselves to form a completely homogeneous solid. Although several sheets of impregnated paper may be employed to form a thicker panel, the resulting product does not have the usual properties of a laminated product in that separation of the product into its constituent sheets is impossible.

The amount of heat and pressure employed and the composition of the resin used for impregnation, can be varied as required, in accordance with the properties desired in the final product. For example, the greater the pressure employed the harder and more resistant will the final material be. Likewise, the degree of flexibility in the resultant product may be readily controlled by varying the amount of heat and pressure and by the selection of a type of resin which will give the desired properties.

Any suitable resin may be employed, the selection of the resin depending upon the desired physical properties such as surface gloss, flexibility, hardness, etc. For example, I may employ a vinyl resin such as the polyacetal or polyvinyl acetate because of the facility with which variations in physical properties such as surface gloss, flexibility, hardness, etc., may be obtained by varying constituents of the resin. Moreover, transparent or translucent resins are more readily obtained with the vinyl types. After the paper has been impregnated with the resin, the very high powers of absorption of the alpha cellulose cells of which the paper consists results in all of the cells of the paper having acquired the properties of the resin, each cell adhering tenaciously to the immediately adjacent or juxtaposed cells with a very strong bond. When single sheets are superimposed to form thicker sheets, or panels, and heat and pressure is applied thereto to unite the same, the application of the proper degree of heat results in softening the resin and thereby reducing the strength of the bond between the impregnated cells so that when pressure is simultaneously applied the impregnated cells or colloidal particles of the alpha cellulose paper are in a state of complete plasticity and, under the influence of the pressure, flow freely to form a homogeneous solid body.

Of course it will be understood that, although for cheapness of manufacture and feasibility in handling, the formation of the alpha cellulose base in sheet or paper form, either in continuous rolls or sheets of any desired size, is preferred, it may be found desirable in some instances to treat the alpha cellulose base in mass form, in which case the impregnation of the particles with resin may be performed by suitable agitation of the particles in a resin solution. In any event, either in the manufacture of the base material into paper form or handling in mass form, it is of the utmost importance that the process employed be that of a very gentle treatment so as to avoid maceration or destruction of the natural absorptive properties of the cells of the cellulose.

Because of microscopic length of the individual threadlike groups of cells and the complete impregnation of the cells none of the thermoplastic properties of the resin used for impregnation are sacrificed, therefore, the resultant product has none of the objectionable features of plastics heretofore constructed with fibrous or amorphous fillers, yet the alpha cellulose contained in the hurd paper, for example, constitutes approximately 70 per cent of the mass, obtained from a very abundant and cheap source of supply, with but 30 per cent of the more expensive resinous materials, while the resultant product has all of the highly desired attributes and qualities of the resin.

For example, there are abundant quantities of various forms of plant life with a high alpha cellulose content too numerous to enumerate, which can be employed as sources of supply.

As hereinbefore pointed out any desired color effect may be produced in the resin employed, or contrasting or different colors may be produced on opposite faces of panels by impregnating the outer sheets thereof with different colored resins. Very effective color designs may also be produced by printing the alpha cellulose paper before impregnating it with the resin and then impregnating with a clear or transparent resin.

When highly water resistant properties are desired a final coating of the impregnated articles may be given with a phenol resin.

After the material is made up into sheet or panel form, articles of any desired configuration may be made in a simple stamping press by the use of heated dies.

The resultant product possesses remarkably high physical properties such as resistance to impact, high tensile and compressive strength; almost any desired surface finish or color can be obtained by selection of the constituents of the resin. In addition, the product is very readily machineable by turning, drilling, planing or other operations and moreover after the product has been formed into any shape, it can be readily reconverted into flat sheets or panels or to any other shape by again subjecting it to heat and pressure.

It is of the utmost importance in preparing the stock that the alpha cells be preserved substantially intact or in other words that no destructive beating or heavy pressures such as employed in ordinary paper making processes be used. As it is desirable to isolate the alpha cell in substantially pure condition and without impairing its absorptive properties it is important that the preliminary treatment or "cook" such, as aforesaid, as a simple soda cook, be mild but sufficient to eliminate the gummy substances without unduly shrinking or otherwise injuring the alpha cell. The cells will automatically combine in the paper mill to form sheets, which sheets must be dried with great care,—too much heat will cause undue expansion and bursting of the cells while too much pressure or friction will crush the cells.

While the stock consisting of the substantially pure alpha cellulose may be formed into sheets in a paper machine the ordinary final steps of paper making must be varied in order to prevent destruction of the alpha cells. It is therefore desirable to transfer the paper from the screen to an apron or belt and to carry the same along such belt while subjecting it to heat until the product is sufficiently coherent to remain in sheet form. It is then preferable to subject the paper to further heat and drying, as for example, by hanging it in festoons in a drying box, or by passing it continuously through a drying box. After the paper has been thoroughly dried it can then be smoothed by passing it through a pair of felt covered rolls while simultaneously subjecting the paper to a slight steaming to facilitate the smoothing operation.

When additional strength is desired in the final product to be prepared out of a plurality of sheets of paper which are to be pressed together, it will of course be obvious that metal inserts in the form of sheets or wires may be placed between the resin impregnated sheets before pressing the same together.

The almost unlimited uses to which the product may be put will readily suggest themselves to those skilled in the art. The cellular vehicle of the present invention either in mass or paper form is to be clearly distinguished from wood pulp, or other papers made of the so-called bast fibers, Musa fibers, strawboard and the like, characteristically fibrous substances which have heretofore been commonly employed. It has heretofore been considered essential to employ these relatively tough fibrous materials of definite fiber lengths which are interfelted by pressure, screen shaking and other mechanical means into sheet or paper form and also in which the basic or raw material is subjected to the action of strong caustic solutions and severe mechanical treatment, such as beaters or Jordans which result in sealing, crushing or breaking the cell structures and thereby considerably impairing, if not entirely destroying, the natural absorptive properties of the cells.

According to the present invention I employ microscopically short threadlike groups of cellulose cells which in their natural state or growth are characterized by their exceptionally high absorptive properties, and which are lacking in the tenacity, toughness and impenetrability of a true fibrous material. The pithy portions or so-called hurds of such plants for example as hemp and many other annuals as hereinbefore pointed out provide an abundant, quickly obtainable and inexpensive source of supply and as the material is treated to maintain the cellular structure undamaged, it is the natural absorptive properties of the cells which are relied upon rather than the production of a felted sheet such as made from commercial wood pulp or other true fibers wherein the interstices between the felted fibers are primarily relied upon for absorption of liquids. As the present invention relies upon maintaining intact the natural absorptive properties of what may be termed those individual cells of the pithy portions of annual plants which cells have much greater powers of absorption than cells of the fibrous growth, the pulp of the present invention instead of consisting of cellular material in which the cells are strongly bound together fibers of definitely apparent fiber length clearly visible to the eye as with all of the pulps heretofore employed, consists of a multiplicity of microscopically short delicate filaments consisting of substantially pure alpha cells, the cell walls and structures of which are fully exposed to absorb with great rapidity any liquids or solvents brought into contact with them. It is therefore possible in using the pulp or paper of the present invention for plastics, to obtain an agglomerate of thoroughly impregnated cells which partake of the physical properties of the resin so that such impregnated cells will mold and flow as readily as the resin even when blended with less than fifty percent by weight of resin, hence a more uniform introduction and distribution of resin over broad surfaces and the forming of larger plastic objects may be more easily effected than heretofore has been commercially possible. Moreover, due to the maintenance of the cells substantially in their natural condition and the relatively tender cellular wall structures of the pithy portions or hurds of the annular plants which may be employed, the material is much more readily soluble in many different types of solutions.

While I have described my invention from the standpoint of its ready application to paper made from the hurds of hemp or other annual plants, it is to be understood that this description is to be considered as illustrative and not as limiting the invention beyond the scope of the claims hereunto appended.

I claim:

1. A thermoplastic composition of matter consisting of an agglomerate of the cells of substantially pure alpha cellulose in substantially sheet-like form obtained from the pithy portions of annual plants, the natural cellular structure of which has been maintained substantially unimpaired and, substantially completely impregnated with a resinous substance adapted to form a uniform homogenous solid by the application of heat and pressure.

2. The method of manufacturing a thermoplastic composition which consists in treating the pithy portions of annual growing plants to remove fibrous and gummy substances to obtain an agglomerate of unhydrated cells of substantially pure alpha cellulose in substantially sheet-like form, thoroughly impregnating the agglomerate with a resinous substance to form a thoroughly thermoplastic mass and adapted upon the application of heat and pressure to form a uniform solid homogenous body having substantially the identical properties of the resin employed for impregnation.

3. As a composition of matter an agglomerate of unhydrated cells consisting substantially of substantially pure alpha cellulose obtained from the pithy portions of annual plants and in the form of a sheet substantially completely impregnated with a resinous substance, the arrangement of such cells being such as to permit them to flow under the application of heat and pressure as a completely thermoplastic material.

4. The method of manufacturing a thermoplastic article which consists in treating the pithy portions of annual growing plants to remove fibrous and gummy substances and obtain an agglomerate of unhydrated cells of substantially pure alpha cellulose, forming the agglomerate so obtained by well known paper making processes to form an unsized, uncalendered paper having exceptionally high absorbent properties, thoroughly impregnating the paper with a resinous substance.

5. The method of manufacturing a thermoplastic article which consists in treating the pithy portions of annual plants to remove fibrous and gummy substances and obtain an agglomerate of unhydrated cells of substantially pure alpha cellulose, forming the agglomerate so obtained by well known paper making processes to form an unsized, uncalendered paper having exceptionally high absorbent properties, thoroughly impregnating the paper with a resinous substance, cutting the paper into sheets, superposing the cut, impregnated sheets and applying heat and pressure thereto to form a thermoplastic board of any desired degree of thickness adapted upon, the application of heat and pressure causing the impregnated cells of the paper to flow to form a thoroughly homogeneous solid.

6. A thermo-plastic composition adapted to be molded by the application of heat and pressure to form a substantially completely homogeneous mass, comprising a hemp or flax hurd paper in which the cellulosic portion consists substantially of filaments of cellular material obtained from the pithy portions of hemp or flax and which is impregnated with a resin.

7. The method of manufacturing a thermoplastic article which consists in treating the pithy portions of annual growing plants to remove fibrous or gummy substances and obtain an agglomerate of unhydrated cells of substantially pure alpha cellulose, forming the agglomerate so obtained to form an unsized, uncalendered paper having exceptionally high absorbent properties, thoroughly impregnating the paper with a resinous substance, cutting the paper into sheets, superposing the cut, impregnated sheets and applying heat and pressure thereto to form a thermoplastic board of any desired degree of thickness, adapted upon the application of heat and pressure to cause the impregnated cells of the paper to flow to form a thoroughly homogeneous solid.

8. As an article of manufacture an unsized, unhydrated and uncalendered sheet, the cellulosic portion of which consists substantially of unhydrated cellular material obtained from the hurds or pithy portions of annual plants from which gummy substances have been removed while the natural highly absorptive properties of said cells have been retained.

9. The process of forming a highly absorptive vehicle for liquids which comprises treating raw material consisting substantially of the pithy portion of annual plants to remove gummy and ligneous substances without unduly shrinking or injuring the cellular structure thereof, and thereafter forming the highly absorptive vehicle into a sheet without destructive beating to retain the natural absorptive properties of the cells of said material.

10. The process of forming a highly absorptive vehicle for liquids which comprises treating raw material consisting substantially of the pithy portion of annual plants to remove gummy and ligneous substances without unduly shrinking or injuring the cellular structure thereof, thereafter forming the highly absorptive vehicle without destructive beating to retain the natural absorptive properties of the cells of said material, drying, without crushing, said cells to form the same into a coherent highly absorptive paper sheet.

11. The process of forming a highly absorptive vehicle for liquids which comprises treating raw material consisting substantially of the pithy portion of annual plants to remove gummy and ligneous substances without unduly shrinking or injuring the cellular structure thereof, thereafter forming the highly absorptive vehicle without destructive beating to retain the natural absorptive properties of the cells of said material, and treating said material with a resin to cause complete impregnation of said cells with said resin and to impart to said cells the physical properties of said resin.

12. The process of forming a highly absorptive vehicle for liquids which comprises treating raw material consisting substantially of the pithy portion of annual plants to remove gummy and ligneous substances without unduly shrinking or injuring the cellular structure thereof, thereafter forming the highly absorptive vehicle without destructive beating to retain the natural absorptive properties of the cells of said material, drying, without crushing, said cells to form the same into a coherent highly absorptive paper sheet and treating said material with a resin to cause complete impregnation of said cells with said resin and to impart to said cells the physical properties of said resin.

13. As an article of manufacture a highly absorbent uncalendered paper, in which the cellulosic portion consists substantially of filaments of unhydrated cellular material obtained from the pithy portions of annual plants and substantially free of naturally occurring gums and resins, the natural cellular structure of which has been maintained substantially unimpaired.

14. The method of manufacturing a thermoplastic article, which consists in isolating alpha-cellulose cells from the pithy portions of annual plants such as hemp or flax and in the form of an agglomerate, spreading the agglomerate to web-like form while draining moisture therefrom, completely drying the web-like structure so formed and all while substantially retaining the cellular structure of the individual alpha-cellulose cells and while retaining such cells in loosely felted relationship one to the other; thoroughly impregnating such web-like structure and substantially all of such cells with a resinous substance in the form of a liquid, superimposing portions of such impregnated web-like structure one upon the other to form a mass of impregnated material, adapted upon the application of heat to form a substantially homogeneous solid.

15. Steps in the method of forming an article of commerce, which consists in isolating alpha-cellulose from pithy portions of annual plants such as hemp or flax in the form of an agglomerate and while substantially retaining the cellular structure of the individual alpha-cellulose cells, spreading such agglomerate to web-like form while draining moisture therefrom and while substantially retaining the cellular structure of the individual alpha-cellulose cells and retaining such cells in loosely felted relationship one to the other, and then in thoroughly drying the web-like structure while substantially retaining the cell-like structure of the alpha-cellulose cells and while retaining such cells in loosely felted relationship one to the other.

16. A method of making a thermo-plastic composition which comprises subjecting the pithy portions of annual plants high in alpha-cellulose content such as hemp and flax to a mild soda cook, separating out the alpha-cellulose cells in the form of a cellular agglomerate of high absorptivity substantially free from non-alpha-cellulosic components, forming a loose dry paper-like web from said agglomerate while retaining the individual cells in substantially their original form and condition and thoroughly and uniformly impregnating such paper-like web with a vinyl resin of high viscosity to form a homogeneous composition having the thermo-plastic qualities of the vinyl resin itself.

17. A thermo-plastic sheet-like article in which the cellulosic portion consists essentially of a homogeneous mass of alpha-cellulose cells obtained from the pithy portions of annual plants, the natural cellular structure of which has been maintained substantially unimpaired and a resinous binder in which the cellular structure of all such cells is substantially retained and each such cellular structure is thoroughly impregnated with such resinous binder.

18. A thermo-plastic article in which the cellulosic portion consists essentially of a homogeneous mass of alpha-cellulose cells, obtained from the pithy portions of annual plants, and substantially free of naturally occurring gums and resins and the natural cellular structure of which has been maintained substantially unimpaired and a resinous binder in which the cellular structure of all such cells is substantially retained and each such cellular structure is thoroughly impregnated with such resinous binder, the article containing a predominant proportion of said pithy portions and a minor proportion of said resinous binder.

19. As an article of manufacture a highly absorptive material in which the cellulosic portion consists substantially of unhydrated cellular material obtained from the pithy portions of annual plants, substantially free of naturally occurring gums and resins and the natural cellular structure of which has been maintained substantially unimpaired and a resinous binder thoroughly impregnating said cellular structure and being present in an amount less than that of the cellular structure.

20. As an article of manufacture a highly absorptive material in which the cellulosic portion consists substantially of unhydrated cellular material obtained from the pithy portions of annual plants, substantially free of naturally occurring gums and resins and the natural cellular structure of which has been maintained substantially unimpaired and a resinous substance thoroughly impregnating said cellular structure, the cellular structure ranging from approximately 60 to 85% and the resinous substance being present in an amount substantially from 40 to 15%.

ALEXANDER J. AUCHTERLONIE.